Figure 1:
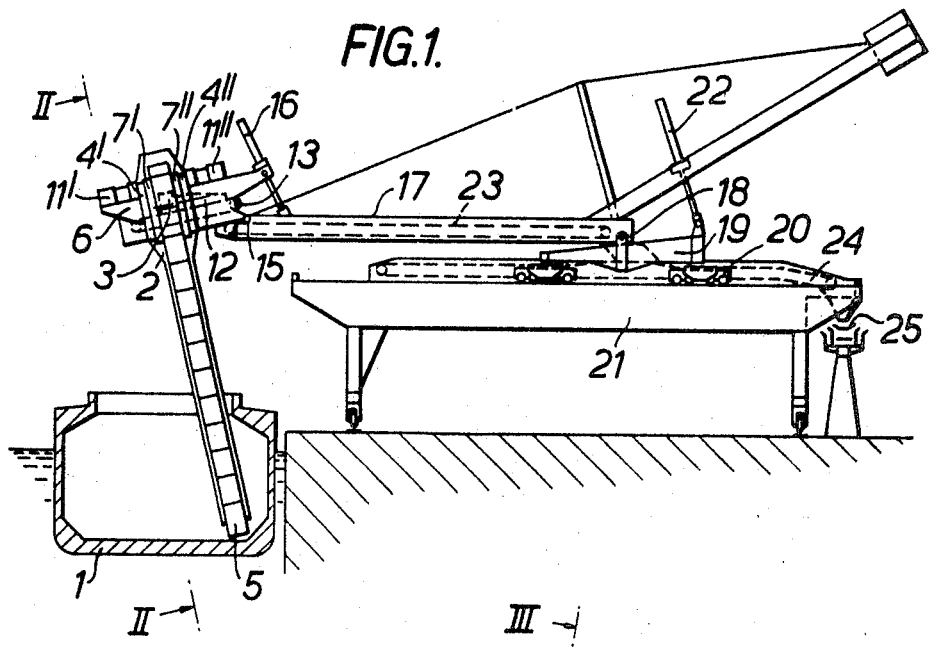

United States Patent

Peuker et al.

[15] 3,640,376
[45] Feb. 8, 1972

[54] UNLOADER FOR BULK MATERIAL IN WHICH A CHAIN BUCKET ELEVATOR CONSTITUTES THE RECEIVING AND ELEVATING APPARATUS

[72] Inventors: Kurt Peuker, Cologne; Heinrich Sommer, Porz-Westhofen, both of Germany

[73] Assignee: Pohlig-Heckel-Bleichert, Vereinigte Maschinenfabriken A.G., Cologne, Germany

[22] Filed: Mar. 12, 1970

[21] Appl. No.: 18,847

[52] U.S. Cl. ............................................................. 198/91
[51] Int. Cl. ..................................................... B65g 37/00
[58] Field of Search ...................................... 198/88, 91–92, 198/94, 96, 118, 120–121, 123; 214/14

[56] References Cited

UNITED STATES PATENTS

| | | |
|---|---|---|
| 1,480,470 | 1/1924 | Rosenberg ..........................198/123 X |
| 3,349,892 | 10/1967 | Barre ....................................198/94 X |
| 3,387,721 | 6/1968 | Ludwig ................................198/94 X |

*Primary Examiner*—Edward A. Sroka
*Attorney*—Woodhams, Blanchard and Flynn

[57] ABSTRACT

The invention relates to a chain bucket elevator for handling bulk material in the unloading of ships, in which the bucket elevator is swiveled in the plane of rotation of the buckets and in which the distance between the upper and lower axes of the bucket chain guides remains constant.

3 Claims, 3 Drawing Figures

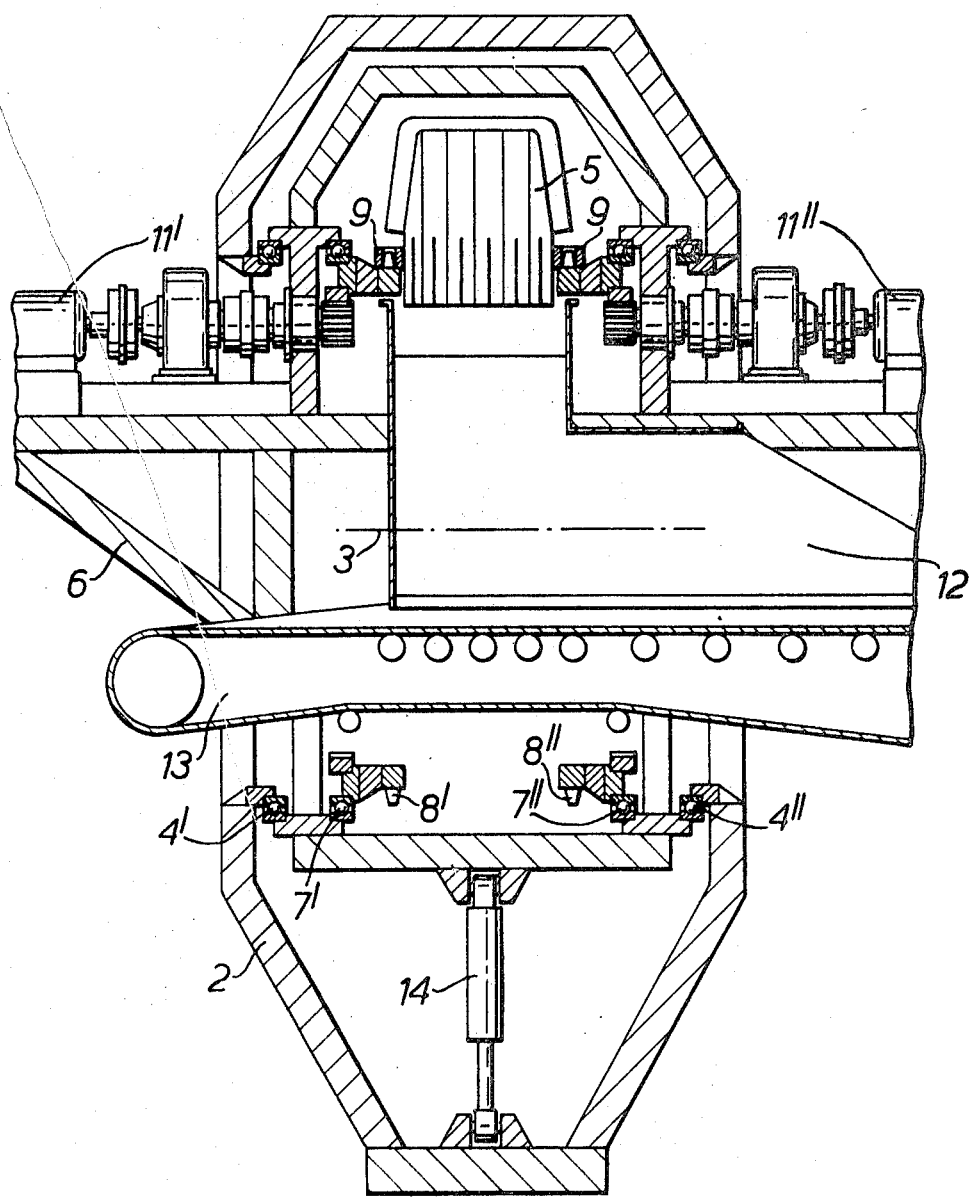

UNLOADER FOR BULK MATERIAL IN WHICH A CHAIN BUCKET ELEVATOR CONSTITUTES THE RECEIVING AND ELEVATING APPARATUS

The invention relates to an unloader for bulk material. The unloader is provided with a chain bucket-elevator serving as the means by which the material is received, lifted and discharged on to a conveyor belt provided within the upper guide of the bucket-elevator chains, and which is provided with a supporting frame for the bucket-elevator chains.

It is an object of the invention to construct an unloader of the aforementioned kind in such manner that when the bucket-elevator is swiveled in the plane of rotation of the buckets, the distance between the upper and lower axes of the chain guides remains constant and the disadvantageous consequences of changes in the distance between these axes are thus avoided. In the unloader of the construction according to the invention, a special device for equalizing changes in the distance between the axes of the chain guides is thus dispensed with.

In accordance with the invention, an unloader of the kind hereinbefore referred to is so constructed that the rigid supporting frame of the bucket-elevator is adapted to swivel about the axis of rotation of the upper chain guide.

The unloader according to the invention may advantageously serve as a ship unloader, in which the bucket-elevator may be swiveled in two planes extending at right angles to each other.

In one particularly advantageous modified construction of ship unloader according to the invention, the axis of rotation of the upper chain guide lies at a right angle to the axis of rotation by which the bucket-elevator head is hinged to a jib.

Figure 2:
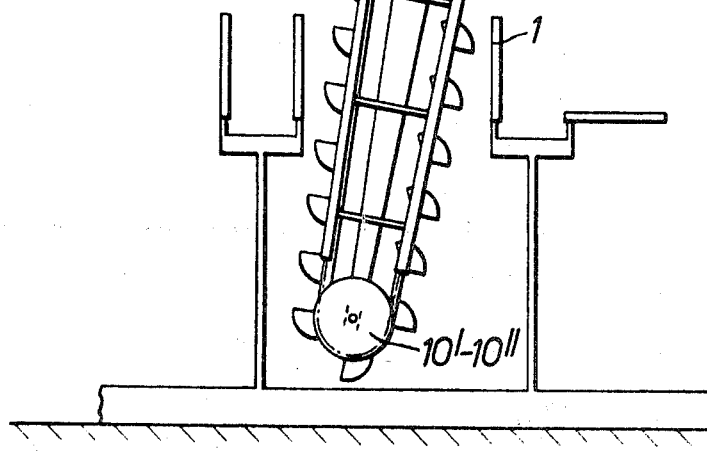

One construction of ship unloader according to the invention is illustrated in the drawings, in which FIG. 1 shows a view of the ship unloader;

FIG. 2 shows a section through the bucket-elevator along the section II—II of FIG. 1, and FIG. 3 shows a section through the upper guide of the bucket-elevator along the line III—III in FIG. 2.

In the drawings, the ship to be unloaded is denoted by the reference numeral 1. The supporting frame of a bucket elevator 5 is rotatable about an axis of rotation 3 by means of bearings 4' and 4". The bearings 4' and 4" are supported in the elevator head 6. The chains 9' and 9" of the bucket-elevator 5 are driven by driving sprockets 8, 8" mounted in bearings 7, 7" coaxial with the bearings 4' and 4". The chains 9' and 9" are passed over guide sprockets 10' and 10" mounted in a supporting frame 2 and serving as the means by which the chains 9' and 9" are tightened. The elevator head 6 carries the drives 11' and 11" of the sprockets 8' and 8" of the chains 9' and 9" respectively. The elevator head carries also a discharge hopper 12 and a conveyor belt 13. The supporting frame 2 with the bucket-elevator 5 may be swiveled about a common axis of rotation 3 by means of a hydraulic device 14 which is supported on the elevator head 6. The elevator head 6 is hinged to a swivel axis 15 which lies at right angles to the axis of rotation 3. The axis 15 is mounted in a jib 17. The elevator head 6 may be swiveled about the axis 15 by a hydraulic device 16 supported at one end by the jib 17. The jib 17 is pivotally mounted at the position 18 on a chassis 19 travelling by means of roller 20 on a bridge 21. The jib 17 is pivotally moved by a hydraulic cylinder 22 to lift or to lower the elevator head 6 and the bucket-elevator 5. The distance covered by the chassis 19 with the jib 17, that is to say the length of the bridge 21, is determined by the width of the ship 1 which is to be unloaded. Conveyor belts 23 and 24 to which the conveyed material is transferred from the belt 13 and by which it is conveyed, for example to a conveyor belt 25 provided along the quay, wharf or pier, are mounted in the jib 17 and in the bridge 21. Trucks or wagons standing under the bridge may be loaded by suitable known devices.

We claim:

1. An unloader for bulk material, comprising:
   jib means;
   head means pivotally connected to said jib means for relative pivotal movement therebetween about a first axis;
   means coacting between said head means and said jib means for permitting pivotal movement of said head means relative to said jib means about said first axis within a first plane;
   conveyor means associated with said elevator head means;
   chain-bucket elevator means for lifting and transporting material and for discharging same onto said conveyor means, said elevator means including a support frame and a rotatable guide element disposed adjacent the upper end thereof and mounted for rotation relative to said head means about a second axis which is substantially perpendicular to said first axis; and
   means coacting between said head means and said support frame for causing pivotal movement of said elevator means about said second axis within a second plane which is substantially perpendicular to said first plane;
   whereby said elevator means can be swingably moved within two planes extending at substantially right angles to one another.

2. An unloader according to claim 1, wherein said first axis is disposed substantially horizontally, and further including support means movably supporting said jib means for linear horizontal movement in a direction substantially perpendicular to said first axis.

3. An unloader according to claim 2, further including hinge means coacting between said support means and said jib means for permitting said jib means to be vertically pivotally moved about a substantially horizontal axis for permitting lowering or lifting of said elevator means.

* * * * *